Patented Apr. 9, 1940

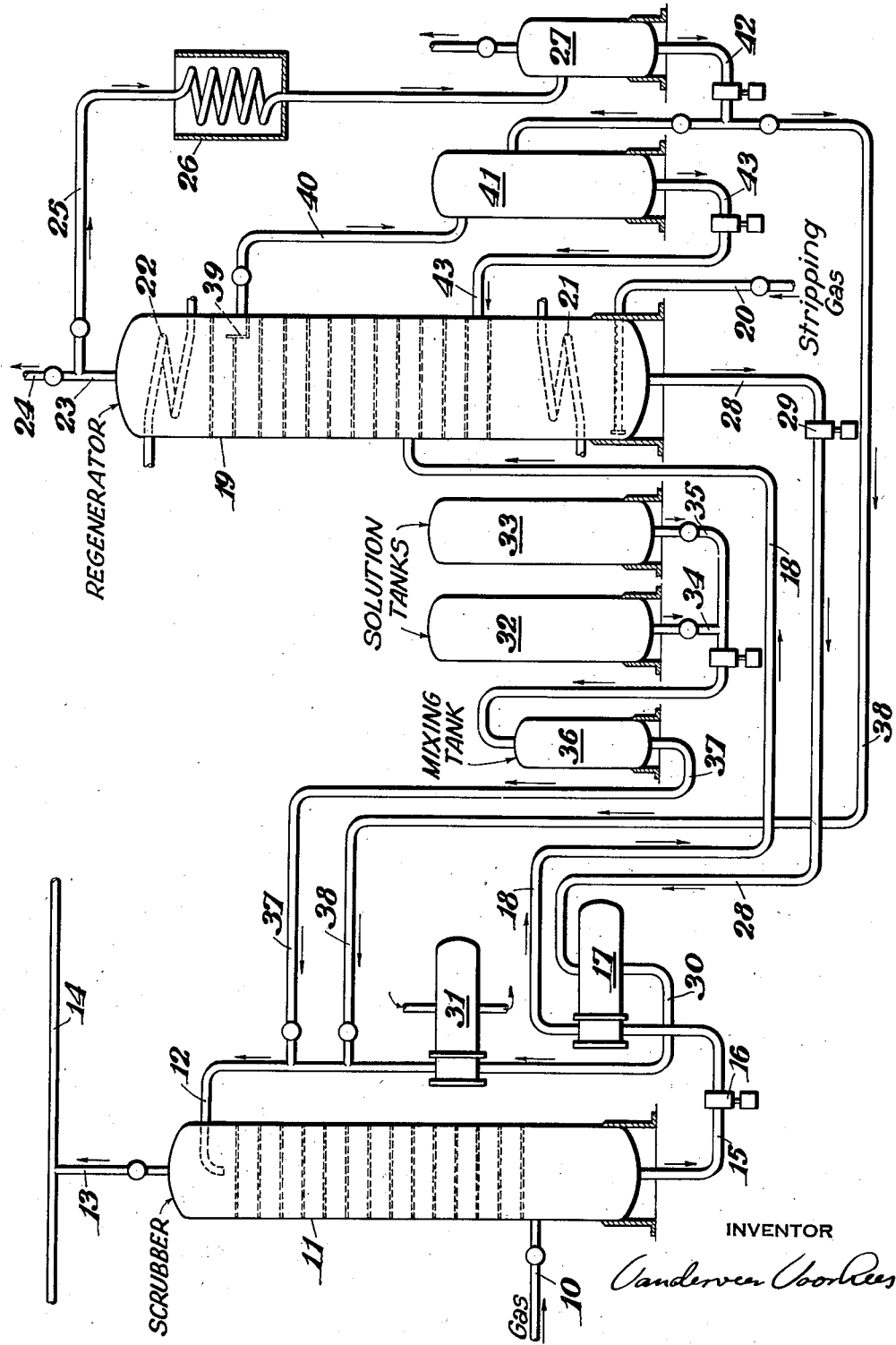

2,196,281

UNITED STATES PATENT OFFICE 2,196,281

PURIFICATION OF GASES

Vanderveer Voorhees, Hammond, Ind., assignor to Standard Oil Company, Chicago, Ill., a corporation of Indiana Application October 25, 1937, Serial No. 170,747

5 Claims. (Cl. 23—2)

This invention relates to a process of treating gases and more particularly the process of treating gases, such as fuel gases, in order to remove therefrom acidic contaminations such as hydrogen sulfide, carbon dioxide, etc. One of the objects of the invention is to provide a continuous process for removing hydrogen sulfide from fuel gas, natural gas, gases from coke ovens, cracking stills, etc. Another object of the invention is to provide a continuous process of removing hydrogen sulfide by absorption in a chemical reagent wherein the reagent may be used repeatedly with a minimum loss in the process. Still another object of the invention is to provide a new absorbing reagent for removal of carbon dioxide, hydrogen sulfide and other weakly acidic gaseous substances, which reagent possesses certain advantages over reagents employed heretofore.

The reagent which I employ in my process is an alkali salt of a mono chlorinated derivative of phenol of the class consisting of ortho chlorphenol, para chlorphenol and meta chlorphenol. I prefer to employ the sodium salts of the mono chlorphenols, but I may also employ the potassium salts or other water soluble salts of the chlorphenols with strong bases, or mixtures thereof. Of the three mono chlorphenols, I prefer to employ the ortho and para derivatives, and particularly a mixture of ortho chlorphenol and para chlorphenol. A mixture containing about 60% of para chlorphenol and about 40% of ortho chlorphenol is suitable, although various other compositions may be employed in which the amount of ortho compound may constitute from about 20% to about 80% of the total. The mixture may be contaminated with small amounts of other phenols, for example from 2% to 10% of cresol, phenol, dichlorphenol, etc., may be present without departing from the spirit of my invention. In conducting the process I prefer to employ a solution of chlorphenol and sodium hydroxide wherein the proportion of sodium hydroxide to chlorphenol is approximately equimolecular, or the solution may contain a slight excess of the chlorphenol. Too great an excess of the chlorphenol reduces the capacity of the solution for absorbing hydrogen sulfide and may unnecessarily complicate the regeneration of the solution.

The accompanying drawing which forms a part of this specification shows diagrammatically one form of an apparatus suitable for carrying out the process. Referring to the drawing, gas containing hydrogen sulfide, for example refinery gas, blast furnace gas, coke oven gas, etc., which may contain about 0.1% to about 5% by volume of $H_2S$, may be introduced by line 10 into scrubber 11 where it is brought into intimate contact with descending treating solution introduced into the scrubber by line 12. Treated gas substantially free from hydrogen sulfide is withdrawn by line 13 leading to gas main 14.

Treating solution containing dissolved hydrogen sulfide is withdrawn from the scrubber 11 by line 15 and pump 16, heated by passing through heat exchanger 17 and thence by line 18 is introduced into regenerator 19. Regenerator 19 is a combination fractionating and stripping tower, the upper section preferably being supplied with bubble plates and the lower section with baffles or bubble plates to provide efficient stripping. Stripping gas, for example flue gas, air or steam, may be introduced by line 20 at the base of the regenerator and heat may be supplied to the solution in the base of the regenerator by closed steam heating coil 21. Cooling may be supplied at the top of the regenerator by reflux coil 22 which serves to condense a portion of the water and any mono chlorphenol which may be carried upward through the regenerator.

Hydrogen sulfide which is driven off from the solution in regenerator 19 by the combined action of stripping gas and heat is conducted by line 23 to vent 24 or it may be conducted by line 25 to condenser 26 where it is cooled further to condense water and traces of mono chlorphenol which may be carried over and which are collected in receiver 27. Any amount of mono chlorphenol thus collected may be separated from the water and returned to the system as provided hereinafter. If desired, a reduced pressure may be supplied by suitable vacuum pump to regenerator 19 to assist in liberation of hydrogen sulfide from the solution.

The hot regenerated solution is withdrawn from the bottom of 19 by line 28 and pump 29 and passes through heat exchanger 17 and thence by line 30 to cooler 31 where the temperature is reduced to a conveniently low temperature obtainable by the cooling water, for example 70 to 90° F. The cooled solution then flows by line 12 to absorber 11 as previously described. In order to compensate for unavoidable loss of solution which may occur by mechanical leakage, etc., additional chlorphenol from supply tank 32 and sodium hydroxide solution from tank 33 are conducted by lines 34 and 35 respectively to mixer 36 where the desired sodium chlorphenolate is produced which is delivered by line 37 into circulating line 12. The desired ratio of chlorphenol and sodium hydroxide in the circulating solution may also be altered by introducing either constituent to the stream by the same means. The total concentration of sodium chlorphenolate in the circulating aqueous solution may be varied over a considerable range, but it is preferred to employ a concentration of about 20% to about 30%. If the solution becomes too dilute by condensation of moisture from the gas introduced by line 10 I may restore the concentration either by adding additional more-concentrated solution by line 37 or by withdrawing water vapor from the regenerator 19 by line 23 which may be controlled by regulating the temperature of reflux coil 22. However, column 19 may be operated in such a manner that some chlorphenol is carried over with the water vapor and condensed in condenser 26, in which case the dilute solution of chlorphenol and water may be returned to the system by lines 42 and 38. Water may also be introduced by this means to dilute the solution when desired.

The operation of my process and similar processes depends on the ready hydrolysis of the solution in the absorber 11 with the formation of free sodium hydroxide which is available for absorbing hydrogen sulfide by the formation of sodium hydrogen sulfide, NaHS. The sodium hydrogen sulfide is subsequently decomposed in regenerator 19 at the higher temperature under which conditions hydrogen sulfide is volatilized from the solution, thus shifting the equilibrium in the direction of reforming sodium chlorphenolate. The chlorphenol plays the role of a weak acid of high boiling point which yields sodium hydroxide to the hydrogen sulfide in the absorber and regains the sodium hydroxide in the regenerator without itself being removed from the process. It is obvious that an acid, in order to be successfully employed in the process, must produce a hydrogen ion concentration in the solution within a relatively narrow range; otherwise, if the hydrogen ion concentration is too high the solution will not efficiently absorb the $H_2S$ and if too low, too great heating will be required in the regenerator to force out the hydrogen sulfide. I have discovered that the mono chlorphenols ionize within an advantageous range for this process, providing a maximum removal of $H_2S$ from the gases treated and a maximum ease of regeneration.

In one manner of operating my process I may employ a sufficient excess of mono chlorphenol in the solution to effect a fractionation of mono chlorphenol from the corresponding sodium salt in regenerator 19 with the result that some mono chlorphenol may be condensed by reflux cooler 22 and collected in trap-out plate 39. Being heavier than water, the chlorphenol immediately separates and may be withdrawn by valved line 40 to tank 41 into which recovered phenol from receiver 27 may also be introduced by line 42. Chlorphenol recovered in this way may be reintroduced into the base of the regenerator 19 by line 43 as desired, assisting in maintaining the proper equilibrium conditions for removal of hydrogen sulfide.

Having thus described my process, what I claim is:

1. The process of removing weakly acidic gas from a gaseous mixture, which comprises contacting said gaseous mixture with an aqueous alkaline solution of monochlorphenol containing ortho and para monochlorphenol in the proportion of about 20% to about 80% of ortho monochlorphenol, withdrawing and heating said solution to regenerate it, then cooling and returning it to said contacting step.

2. The process of removing hydrogen sulfide from fuel gases which comprises intimately contacting said fuel gases with a solution of monochlorphenol and sodium hydroxide, wherein said monochlorphenol comprises para monochlorphenol and about 20% to about 80% of ortho monochlorphenol, absorbing said hydrogen sulfide in said solution, transferring said solution to a regenerating zone wherein it is subjected to heating and stripping to remove dissolved hydrogen sulfide and then cooling the regenerated solution and returning it to said contacting step.

3. In the process of removing weakly acidic gases such as $H_2S$ and $CO_2$ from fuel gas mixtures wherein the gas is intimately contacted with a solution of sodium monochlorphenolate containing ortho and para monochlorphenol in the proportion of about 20% to about 80% of ortho monochlorphenol, said weakly acidic gases are subsequently removed from the spent solution by heating and stripping and the regenerated solution is recirculated to the contacting step, the improvement comprising employing an excess of chlorphenol in said sodium chlorphenolate solution, distilling said excess monochlorphenol from said solution in said regenerating step, condensing said distilled monochlorphenol and returning it to said spent sodium chlorphenolate solution entering said regenerating step.

4. The process of removing weakly acidic gas such as $H_2S$ and $CO_2$ from a gaseous mixture which comprises contacting said gaseous mixture with an aqueous alkaline solution of monochlorphenol containing ortho and para monochlorphenol in the ratio of about 40% of ortho monochlorphenol and 60% of para monochlorphenol, withdrawing and heating said solution to regenerate it, then cooling and returning it to said contacting step.

5. The process of removing hydrogen sulfide from fuel gases which comprises intimately contacting said fuel gases at ordinary temperatures with an aqueous alkaline solution of monochlorphenol in which ortho and para monochlorphenol predominate and wherein ortho monochlorphenol constitutes from about 20% to about 80% of the total, absorbing said hydrogen sulfide in said solution, transferring said solution to a regenerating zone wherein it is subjected to heating and stripping and dissolved hydrogen sulfide is removed, cooling the regenerated solution and returning it to said contacting step.

VANDERVEER VOORHEES.